United States Patent Office 2,740,773
Patented Apr. 3, 1956

2,740,773

PROCESS OF PRODUCING POLYMERIC ACRYLONITRILE MATERIALS

George E. Ham, Dayton, Ohio, assignor, by mesne assignments, to The Chemstrand Corporation, a corporation of Delaware No Drawing. Application November 3, 1951,
Serial No. 254,800

16 Claims. (Cl. 260—88.7)

This invention relates to a process for producing polymeric materials. More particularly the invention is concerned with the polymerization in an aqueous medium of a monomeric material or materials comprising acrylonitrile or other nitrile of an α-methylene aliphatic monocarboxylic acid, the resultant polymeric materials having enhanced thermal stability and enhanced fiber and film-forming properties.

While the present invention is applicable to the polymerization of nitriles of α-methylene aliphatic monocarboxylic acids, for purposes of simplicity of description the invention will be described as it is applicable in preparing polymers and copolymers of acrylonitrile, it being understood, however, that this is merely intended in an illustrative sense and the invention is not to be limited thereby but only insofar as the same may be limited by the appended claims.

It is well-known in the art that polymers of acrylonitrile and other nitriles of α-methylene aliphatic monocarboxylic acid such as methacrylonitrile, ethacrylonitrile, or the like, either alone or in admixture with each other or with lesser amounts of other polymerizable compounds, form excellent fiber-forming compositions.

Polyacrylonitrile and certain copolymers containing predominate amounts of combined acrylonitrile have been spun by adaptations of wet or dry processes to strong fibers which have shown good durability and chemical resistance. Because of the high strength there has been a great desire for these fibers in the manufacture of tire cords for use in heavy-duty truck tires and aircraft tires, and the like, as well as in wrapped insulation, smoke filters, etc., and in other applications which require high strength fibers whose tenacity has not greatly decreased at the elevated temperatures which may be developed during normal usage. However, fibers formed from polyacrylonitrile, and the like, have not been too satisfactory for these purposes because of the decrease in tenacity thereof at high temperatures. That is, fibers formed from polyacrylonitrile, and the like, produced by known methods, have not been satisfactory for the above indicated end uses because of insufficient thermal stability.

It is the general object of the present invention to provide a new process for the production of polymeric materials.

It is another object of the invention to provide a new process for producing heat stable polymers and copolymers from monomeric materials comprising acrylonitrile or other nitrile of an α-methylene aliphatic monocarboxylic acid.

It is still another object of the invention to produce polymeric materials having improved thermal stability and improved fiber and film-forming properties.

Other objects and advantages of the present invention will be apparent from the description thereof hereinafter.

In general, the objects of the present invention are accomplished by preparing polymers and copolymers from monomeric materials comprising acrylonitrile or other nitriles of an α-methylene aliphatic monocarboxylic acid in an aqueous medium and in the presence of a halogenated alkyl nitrile containing from 2 to 18 carbon atoms. The preferred halogenated alkyl nitriles for use in the present invention are those having the general formula:

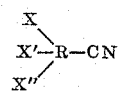

Wherein R represents an alkyl radical having from 1 to 17 carbon atoms, and X, X', and X'' each may be hydrogen, chlorine, bromine, or fluorine, said X, X', and X'' being attached to any one or more than one of the carbon atoms of the alkyl radical, provided that at least one of the X, X', and X'' is a chlorine, bromine, or fluorine atom. As examples of suitable compounds there may be named the following: chloroacetonitrile, dichloroacetonitrile, trichloroacetonitrile, bromoacetonitrile, dibromoacetonitrile, α-chloropropionitrile, β-chloropropionitrile, β-β'-dichloropropionitrile, α,α'-dichloropropionitrile, chlorobutyronitrile, chlorovaleronitrile, chlorocaprionitrile, bromovaleronitrile, bromocaprionitrile, chlorolauronitrile, chloropalmitonitrile, trichloropropionitrile, fluoroacetonitrile, β-fluoropropionitrile, fluorovaleronitrile, chlorofluoroacetonitrile, etc.

The compounds having the above general formula may be employed in concentrations of 5 to 50% by weight of the monomer or monomeric substances present in order to obtain the desired results. The compounds listed above remain substantially unchanged during the polymerization reaction. Polymers and copolymers are separated from the reaction mixture by the usual means, such as filtration, crystallization, distillation, etc.

Normally a polymerization catalyst is employed in the process of the present invention. The catalysts are employed in an amount ranging from 0.1 to 2.0% by weight of the monomer charged and preferably between 0.2 and 2.0%. Among the suitable catalysts are the water-soluble peroxy compounds, for example, alkali metal and ammonium persulfates, the alkali metal and ammonium percarbonates, and the alkali metal and ammonium salts of other acids containing the peroxy-(—O—O—)-grouping. Other well-known catalysts may be employed if desired.

If desired, an emulsion or dispersing agent may be employed in the present invention. Among the suitable emulsion or dispersing agents are those compounds which have both the hydrophilic and a hydrophobic radical. Examples of such agents include the common soaps, such as sodium stearate and other alkali metal salts of high molecular weight, carboxylic acid and mixtures thereof as obtained by the saponification of animal and vegetable fats, the salts of sulfonated hydrocarbons, for example the alkali metal salts of sulfonated paraffins, sulfonated naphthalenes, and sulfonated alkylbenzenes, the salts of formaldehyde condensed sulfonic acid and particularly the sodium salt of formaldehyde condensed alkylaryl sulfonic acids, the salts of triethanolamine and other "amino soaps," and alkali salts of sulfonic half esters of fatty alcohols.

The polymerizations may also be conducted in the presence of molecular weight regulators, for example, t-dodecyl mercaptan, thioglycolic acid, thiourea, mercaptobenzothiazole, and carbon tetrachloride. These and other well-known regulators prevent the formation of very high molecular weight polymer increments and tend to induce a more uniform size of polymer molecules.

Practice of the present invention may further be illustrated by the following examples in which all parts are by weight unless otherwise specified. It is to be understood, however, that this is in no way intended to be limitative.

Example I

A mixture of 40 parts of acrylonitrile, 20 parts of α-chloroacetonitrile, 100 parts of water, and 0.4 part of potassium persulfate was placed in a glass reaction vessel. The reactor was then flushed with nitrogen and sealed with a pressure cap lined with polyethylene. The reactor was then agitated by rotation in an air oven at 70° C. for a period of 19.5 hours. A white granular product was obtained which was filtered, washed with water and alcohol and then dried at 50° C. for a period of 24 hours. The dried product was then ground, rewashed with alcohol, and redried. A yield of 38.8 parts of acrylonitrile was obtained or a yield of 97.0%.

A second batch of polyacrylonitrile was prepared under the same conditions outlined above but in the absence of choloracetonitrile. The yield in this instance was only 90.0%.

The two samples of polyacrylonitrile, prepared as above outlined, were then compared in thermal stability in the following manner: 2 Petri dishes were filled with the finely ground polymer samples to a depth of approximately ¼ inch and then placed in an air oven at 180° C. for a period of 1.5 hours. At the end of this period the sample prepared in the presence of 50% chloroacetonitrile was of a slight cream color whereas the control sample, i. e., that prepared in the absence of chloroacetonitrile, was amber in color, thus indicating the greater thermal stability of the polymer prepared in the presence of chloroacetonitrile.

Example II

A mixture of 40 parts of acrylonitrile, 100 parts of water, 7 parts of chloroacetonitrile, 0.4 part of potassium persulfate, and 0.8 part of Ivory soap was placed in a pressure bottle and rotated in an air oven for 19.5 hours at 70° C. The polymer was isolated as in Example I. An 86% yield of polyacrylonitrile ($n_{sp}$ in 0.1% dimethyl formamide of 0.5) was obtained. The thermal stability of this sample when checked as in Example I was found to be very good, the sample being a cream color after the test.

Example III

A mixture of 40 parts of monomeric material (97% acrylonitrile, 3% vinyl acetate), 20 parts chloroacetonitrile, 100 parts of water, and 0.4 part of potassium persulfate were placed in a glass reaction vessel and treated in the same manner outlined in Example I. When heated for 1.5 hours at 180° C. the copolymer was of a slight cream color indicating good thermal stability. A sample of a coplymer of 97% acrylonitrile-3% vinyl acetate, prepared in the presence of 0.4% potassium persulfate, but in the absence of chloroacetonitrile, was also heated for 1.5 hours at 180° C. The sample was dark brown after this treatment indicating poor thermal stability.

Example IV

Polyacrylonitrile was prepared as in Example I, but in the presence of 50% β-chloropropionitrile instead of chloroacetonitrile. The thermal stability of this polymer was as good as that of polyacrylonitrile prepared in the presence of 50% chloroacetonitrile as outlined in Example I above.

Example V

Polyacrylonitrile was prepared as outlined in Example I but in the presence of chlorobutyronitrile in place of chloroacetonitrile. The thermal stability of the polymer was equal to that of the polyacrylonitrile produced in Example I.

Example VI

Polyacrylonitrile was prepared as outlined in Example I with the exception that 25% chloroacetonitrile was employed rather than 50%. The thermal stability of the resulting polymer was equal to that of the polymer produced in Examples I and II.

A series of samples of polyacrylonitrile was prepared in the same manner using varying percentages of chloroacetonitrile, and the like, within the range of 5 and 50% based on the weight of the monomer or monomer mixture present. At a concentration of 5% chloroacetonitrile, or the like, the thermal stability is only increased in a slight amount over that of the control sample. This indicates, therefore, that 5% is the preferred lower limit of the concentration of chloroacetonitrile, and the like, which may be employed in the practice of the present invention and still attain the desired results.

In addition, two samples of polyacrylonitrile were prepared as outlined in Example I but in the presence of 50% ethyl chloroacetate and 50% chloroacetic acid in place of the chloroacetonitrile. In both instances the thermal stability of the samples was poor or less than that of the control polyacrylonitrile sample. This indicates therefore, that while the described nitriles accomplish the objects of the present invention, the corresponding halogenated acids and derivative esters do not accomplish the objects of the invention.

Example VII

A mixture of 30 parts methacrylonitrile, 20 parts of α-chloroacetonitrile, 100 parts of water, and 0.4 part of potassium persulfate was polymerized in the manner outlined in Example I. The polymethacrylonitrile was tested for thermal stability and found to be superior to control samples prepared in the absence of chloroacetonitrile. The polymer was a cream color after the thermal stability test.

When dissolved in suitable solvents, the polymers and copolymers of the instant invention are particularly applicable to the production of fibers having improved thermal stability characteristics. In general the methods of both wet and dry spinning which are commercially in use are readily adaptable to spinning fibers of the polymers and copolymers described herein. Similarly, conventional automatic machinery for continuous spinning, drying the thread if necessary, and winding it upon suitable spools, can be used. As in the case of most synthetic fibers, those obtained in accordance with the present invention should preferably be oriented by stretching in order to develop the optimum physical properties thereof. If desired part of the stretching may be accomplished in the spinning medium by drawing the fiber from the medium at a rate greater than the rate of extrusion. Both continuous and staple fibers may be produced from the instant polymers and copolymers. Oriented staple fibers may be made by stretching the continuous fiber and then cutting to the desired lengths for use in conventional processes, either alone or in admixture with other natural or synthetic fibers. If desired the continuous fibers may be permanently crimped by any of the usual methods prior to being cut into staple fibers.

The polymers and copolymers of the present invention are also useful in the preparation of films by casting a solution of the polymer or copolymer on a smooth surface, such as glass, stainless steel, and the like, and then evaporating the solvent. Also the polymer or copolymer solution may be extruded through an elongated slit into a liquid in which the polymer or copolymer is insoluble thus causing the same to precipitate in the form of a film. Solutions of the polymers and copolymers are also useful as coating compositions in which case various other ingredients, such as blending agents, plasticizers, hardeners, and the like, may be added, if desired.

The following example illustrates a practical means of forming fibers in accordance with the present invention.

Example VIII

A solution of 8% of the polyacrylonitrile of Example II dissolved in dimethylacetamide was spun from a 30-hole (0.005") spinneret into a mixture of 60% N,N'-dimethylacetamide-40% water and the fiber so obtained was washed by passing it through a water trough. The fiber was then continuously dried on a steam-heated drum (4 laps of fiber on the drum) and stretched 144% in a steam tube (conventional design) at 50 lbs./sq. in. gauge of steam. The soft, lustrous fiber so obtained was almost white and possessed excellent and unusual thermal stability.

While an 8% solution of the polyacrylonitrile was employed in the above example, the solution concentration depends upon the molecular weight of the polymer employed. Usually, however, a solution concentration of about 6-30% is satisfactory. In addition the concentration of the spinning bath may vary. For example, from 50 to 70% N,N'-dimethylacetamide and from 50 to 30% water may be employed.

While the invention has been described primarily with reference to the production of polymeric substances, it is equally applicable to the production of copolymers in addition to that described in Example II above, with the same beneficial results. For example, acrylonitrile or other nitrile of an α-methylene aliphatic monocarboxylic acid may be copolymerized in accordance with the present invention with other monomers, such as vinyl acetate, vinylidene chloride, vinyl chloride, dialkyl fumarates, in which the alkyl radical has up to 4 carbon atoms, the dialkyl maleates in which the alkyl radical has up to 4 carbon atoms, the alkyl methacrylates and acrylates, wherein the alkyl radical has up to 4 carbon atoms, styrene, vinylpyridine and the alkyl substituted vinylpyridines, N-vinylimidazole, and other vinyl substituted heterocyclic nitrogen compounds, allyl chloroacetate, methallyl chloroacetate, allyl glycidyl ether, methallyl glycidyl ether, and other mono-olefinic substances, etc. All of the copolymers exhibit unusual thermal stability when the copolymerization is conducted in the presence of chloroacetonitrile or other similar compounds from the group hereinbefore described.

While the present invention is applicable to the production of copolymers from polymerizable monomeric substances in varying concentrations, the most beneficial results, with respect to thermal stability of the resultant copolymer, are obtained when at least 85% of the total polymerizable monomers is acrylonitrile or other nitrile of an α-methylene aliphatic monocarboxylic acid.

The present invention has many advantages among a few of which may be mentioned that polymers and copolymers produced in accordance with the procedure outlined herein, and in particular polyacrylonitrile, are useful in making fibers and films, and also in making molding compositions to be employed in injection molding where thermal stability is extremely important. Fibers produced from polymers and copolymers of the instant invention are useful in the manufacture of tire cord, particularly for heavy-duty truck tires and aircraft tires, and the like. Further, such fibers and films are useful in the manufacture of wrapped insulation wherein resistance to deterioration at elevated temperatures is a vital factor.

The present invention is extremely beneficial in the manufacture and treatment of fabrics formed from the polymers and copolymers described herein, because such operations as stretching, shrinking, ironing, heat-setting of fabrics, etc., require fibers of good thermal stability. Polymers and copolymers of the present invention also find wide use in the manufacture of smoke filters.

The present invention has the advantage of producing polymers and copolymers having increased and unusual thermal stability not heretofore obtainable without an appreciable increase in the cost of manufacture and without material alterations in the process of manufacture. Numerous other advantages and uses of the present invention will be apparent to those skilled in the art from reading the description herein.

It is to be understood that changes and variations may be made without departing from the spirit and scope of the invention as defined in the appended claims.

I claim:

1. A process for producing a heat-stable, fiber-forming polymeric material, which produces fibers of improved color, which comprises polymerizing a material consisting of a nitrile of an alpha-methylene aliphatic monocarboxylic acid, said acid containing a terminal methylene group, in an aqueous medium in the presence of 5 to 50%, based on the weight of the material, of a halogenated alkyl nitrile having the general formula $$R-CN$$

wherein R is a radical selected from the group consisting of mono-, di- and tri-halogen substituted alkyl groups containing from 1 to 17 carbon atoms, and wherein the halogen is selected from the group consisting of chlorine, bromine and fluorine.

2. The process defined in claim 1 wherein the nitrile of an alpha-methylene aliphatic monocarboxylic acid is acrylonitrile.

3. The process defined in claim 1 wherein the halogenated alkyl nitrile is chloroacetonitrile.

4. The process defined in claim 1 wherein the halogenated alkyl nitrile is beta-chloropropionitrile.

5. The process defined in claim 1 wherein the halogenated alkyl nitrile is chlorobutyronitrile.

6. The process defined in claim 1 wherein the halogenated alkyl nitrile is chlorovaleronitrile.

7. The process defined in claim 1 wherein the halogenated alkyl nitrile is $\beta, \beta'$-dichloropropionitrile.

8. A process for producing a heat-stable, fiber-forming polymeric material, which produces fibers of improved color, which comprises polymerizing a material consisting of a nitrile of an alpha-methylene aliphatic monocarboxylic acid, said acid containing a terminal methylene group, in an aqueous medium in the presence of 0.1 to 2.0% by weight of the material of a water-soluble peroxy compound as catalyst, said compound being selected from the group consisting of alkali metal and ammonium salts of acids containing the —O—O— grouping, and 5 to 50% by weight of the material of a halogenated alkyl nitrile having the general formula $$R-CN$$

wherein R is a radical selected from the group consisting of mono-, di- and trihalogen substituted alkyl groups containing from 1 to 17 carbon atoms, and wherein the halogen is selected from the group consisting of chlorine, bromine, and fluorine.

9. The process defined in claim 8 wherein the water-soluble peroxy compound is potassium persulfate.

10. The process defined in claim 9 wherein the nitrile of an alpha-methylene aliphatic monocarboxylic acid is acrylonitrile.

11. The process defined in claim 10 wherein the halogenated alkyl nitrile is chloroacetonitrile.

12. The process defined in claim 8 wherein the halogenated alkyl nitrile is chloroacetonitrile.

13. The process defined in claim 8 wherein the halogenated alkyl nitrile is beta-chloropropionitrile.

14. The process defined in claim 8 wherein the halogenated alkyl nitrile is chlorobutyronitrile.

15. The process defined in claim 8 wherein the halogenated alkyl nitrile is chlorovaleronitrile.

16. The process defined in claim 8 wherein the halogenated alkyl nitrile is $\beta, \beta'$-dichloropropionitrile.

References Cited in the file of this patent

UNITED STATES PATENTS

| | | |
|---|---|---|
| 2,256,148 | Lichty | Sept. 16, 1941 |
| 2,548,282 | Basdekis | Apr. 10, 1951 |
| 2,577,763 | Hoxie | Dec. 11, 1951 |